United States Patent [19]

Kubota

[11] 3,710,013

[45] Jan. 9, 1973

[54] SINGLE TUBE COLOR TELEVISION CAMERA WITH INDEXING MEANS

[75] Inventor: Yasuharu Kubota, Kanagawa-ken, Japan

[73] Assignee: Sony Corporation, Tokyo, Japan

[22] Filed: April 1, 1971

[21] Appl. No.: 130,272

Related U.S. Application Data

[63] Continuation-in-part of Ser. No. 72,593, Sept. 16, 1970.

[30] Foreign Application Priority Data

| | | |
|---|---|---|
| Sept. 18, 1969 | Japan | 44/74175 |
| March 31, 1970 | Japan | 45/27614 |
| March 31, 1970 | Japan | 45/27615 |
| March 31, 1970 | Japan | 45/27616 |
| April 4, 1970 | Japan | 45/28880 |

[52] U.S. Cl. .......... 178/5.4 ST

[51] Int. Cl. .......... H04n 9/06

[58] Field of Search .......... 178/5.4 R, 5.4 ST

[56] References Cited

UNITED STATES PATENTS 2,843,659 7/1958 James .......... 178/5.4 ST

*Primary Examiner*—Robert L. Richardson

*Attorney*—Lewis H. Eslinger, Alvin Sinderband and Curtis, Morris & Safford

[57] ABSTRACT

A color television camera utilizes a vidicon tube having a filter in the form of triads of stripe-like filter elements for the primary colors red, blue and green, sets of electrodes arranged in pairs for each filter element triad and being electrically separated from the photoconductive layer at the side of the latter facing toward the electron gun, and an output or signal electrode apart from the sets of electrodes. An alternating voltage is applied to the sets of electrodes to provide, on the photoconductive layer, a predetermined potential pattern representing an index signal which is overlapped with the color component images of the object to be reproduced provided through the filter. A composite signal made up of an index signal and a color video signal is obtained at the output electrode. Upon the separation of the index signal and the color video signal from the composite signal, the index signal is used to derive the individual color signals from the color video signal.

8 Claims, 8 Drawing Figures

PATENTED JAN 9 1973 3,710,013

SHEET 1 OF 3

INVENTOR
YASUHARU KUBOTA
BY Lewis H. Eslinger
ATTORNEY

INVENTOR
YASUHARU KUBOTA
BY Lewis H. Eslinger
ATTORNEY

INVENTOR
YASUHARU KUBOTA
BY Lewis H. Eslinger
ATTORNEY

SINGLE TUBE COLOR TELEVISION CAMERA WITH INDEXING MEANS

This application is a continuation-in-part of my copending application for U.S. Letters Patent identified as Ser. No. 72,593, filed Sept. 16, 1970, and having a common assignee herewith.

This invention relates to a device for reproducing a color video signal by the employment of one image pickup tube, and more particularly to a color video signal reproducing device capable of producing color signals with are free from crosstalk.

A pickup tube of the type having a target with a multiplicity of color filters and signal plates extending transversely of the direction of line scan has been sprayed in U.S. Pat. No. 2,446,249. In this type of pickup tube, the signal plates corresponding to the color filters are connected to bus bars and the respective primary color video signals are derived from three signal output terminals connected to the bus bars. However, this pickup tube is defective in that each primary color video signal is mixed with other primary color video signals due to the electrostatic capacity coupling present between the respective signal plates or electrodes. This results in crosstalk which lowers the color purity of the color video signal.

There has also been proposed a system, for example, as disclosed in U.S. Pat. No. 3,502,799, in which a plurality of index signal images and striped color component images are optically formed on the target of a vidicon tube to produce a composite color video signal with an index signal therein. With this system, however, the ratio between the color component image area and the effective scanning area of the vidicon is decreased by an amount corresponding to the area occupied by the index signal images. This results in decreased resolution. Further, this prior art system requires a complicated and expensive device for optically forming the index signal images on the target.

Accordingly, it is an object of this invention to provide a pickup tube for a color television camera which produces a color video signal having an index signal therein, with such color video signal being of high resolution and good white balance.

In accordance with an aspect of this invention, a color television camera employs an image pickup tube having sets of index signal forming electrodes, an output electrode, a color filter and a photoconductive surface, and adapted to form color separated images on the photoconductive layer. In addition, an alternating voltage is supplied to the sets of electrodes by which a predetermined pattern of potential changes is formed on the surface of the photoconductive layer of the pickup tube to be reproduced as an index signal. In this manner the index signal does not narrow the dynamic range of the image pickup tube and the resolution of the color video signal is not lowered.

It is a feature of the pickup tube according to this invention that the index signal, luminance signal and chrominance signal are not derived at respective electrodes, but are picked up in the form of one composite signal, so that even if crosstalk exists between the electrodes, color difference signals can be readily derived from a demodulator circuit, and accordingly a color video signal of good white balance can be obtained.

Since the index signal is obtained at the output electrode of the pickup tube in response to supplying of an alternating voltage to the sets of electrodes in synchronism with the line scanning period of the pickup tube, demodulation of the color video signal is easily accomplished. Further, when the color video signal is reproduced without the chrominance signal, the index signal may be simply obtained by adding to the output of the image pickup tube a signal produced by delaying the pickup tube output by one horizontal scanning period. In this manner there is no possibility of the index signal being mixed with the demodulated color video signal.

Further, with the pickup tube according to the present invention, the index signal and the chrominance signal are in the same band, concrete hence the bands of the luminance signal and the chrominance signal can be widened to thereby provide a color video signal with high resolution. In addition, since the index signal and the chrominance signal are derived from a common preamplifier and filter, no difference in the delay time between these signals is produced and accordingly a picture of excellent white balance can be obtained. Further, the index signal does not interfere with the chrominance signal, and hence the picture quality is not degraded by the index signal.

The formation of the color separated images on the photoconductive layer of the pickup tube according to this invention may be accomplished by any conventional method. For example, a lens screen consisting of many lenticular lenses can be disposed on the surface of the face plate of the pickup tube and the image of a color filter, consisting of one or more sets of striped color filter elements and interposed between an object to be televised and the lens screen, is projected by each lens of the lens screen onto the photoconductive layer and, at the same time, the image of the object being televised is projected by an objective lens to overlap the images of the color filter. Alternatively, the image of the object to be televised may be focused by an objective lens onto the photoconductive layer through a color filter disposed inside of the pickup tube in close proximity to the photoconductive layer. In this latter case, the optical system is simple in construction and need not be adjusted, so that an inexpensive color television camera can be produced.

In the pickup tube according to this invention, the relative position of the color filter need not be adjusted with high accuracy, and hence adjustment of the pickup tube is easily accomplished.

The above, and other objects features and advantages of this invention, will be apparent in the following detailed description of illustrative embodiments thereof which is to be read in connection with the accompanying drawings, wherein.

Figure 1:
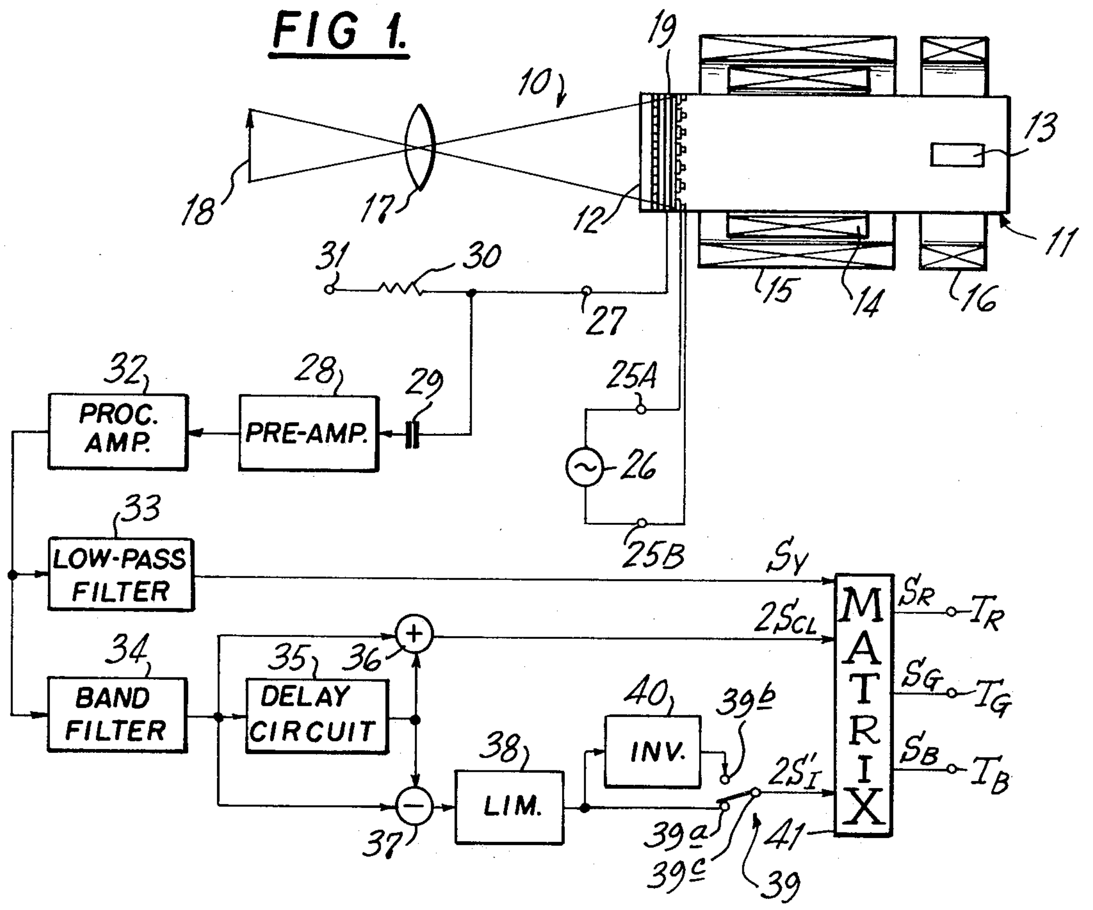
FIG. 1 is a schematic diagram illustrating a color television camera in accordance with an embodiment of the present invention.
Figure 2A:
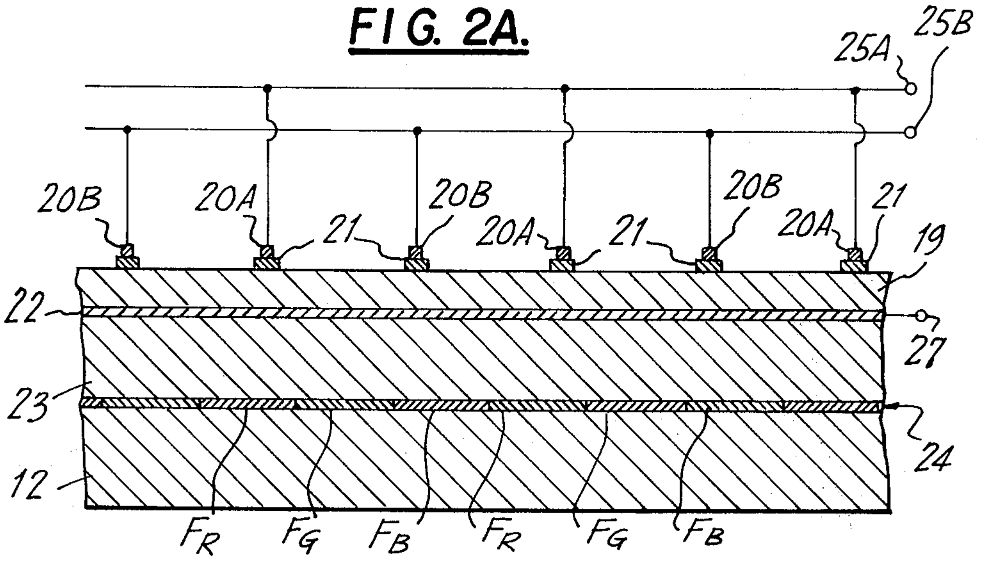
FIG. 2A is an enlarged, fragmentary sectional view showing principal parts of the pickup tube employed in the color television camera illustrated in FIG. 1.

Referring to the drawings in detail, and initially to FIGS. 1 and 2A thereof, it will be seen that a color television camera 10 according to this invention is there shown to comprise an image pickup tube 11, for example, a so-called vidicon tube, having a glass face plate 12 at one end and an electron gun 13 within the tube adjacent its other end for directing an electron beam toward the face plate. Further, as is conventional, a deflection coil 14, a focusing coil 15 and an alignment coil 16 are mounted about the tube 11, and an image lens 17 is provided to project an image of the object 18 to be televised through the face plate 12 and to focus such image onto a photoconductive layer 19 which is located inside pickup tube 11 adjacent the face plate. Such photoconductive layer 19 may be formed of materials such as antimony trisulfide, lead oxide and the like which are commonly employed for the photoconductive layer of image pickup tubes.

In the embodiment shown on FIG. 2A, the pickup tube 11 is further shown to have two sets of spaced apart electrodes 20A and 20B arranged alternately at the side of photoconductive layer 19 facing toward the gun 13, that is, at the side of layer 19 scanned by the electron beam, and being electrically separated from the photoconductive layer, for example, as by the insulating layer 21 interposed between each of the electrodes 20A and 20B and the layer 19. The electrodes 20A and 20B, and the respective insulating layers 21, are of stripe-like configuration and extend in longitudinal directions that cross the horizontal scanning direction of the electron beam emitted by gun 13. Since the stripe-like electrodes 20A and 20B and the insulating layers 21 block the electron beam from landing on the respective areas of photoconductive layer 19, it is preferably to make such electrodes and insulating layers substantially narrow for minimizing the proportion of the photoconductive layer that is shielded thereby from the electron beam.

The tube 11 according to this invention further has an output or signal electrode 22 which in the embodiment of FIG. 2, is constituted by a transparent conductive layer, for example, formed of a tin oxide containing antimony, such as the so-called Nesa. The transparent conductive layer constituting signal electrode 22 is deposited on one surface of a glass plate 23 so as to be at the side of photoconductive layer 19 facing away from the electron gun 13, and an optical filter 24 is provided on the other surface of plate 23, that is between the latter and face plate 12.

The optical filter 24 is made up of triads of red, green and blue color stripe-shaped filer elements $E_R$, $F_G$ and $F_B$ arranged in a repeating cyclic order of $F_R$, $F_F$, $F_B$, $F_R$, $F_G$, $F_B$, . . . and being disposed parallel to the stripe-like electrodes 20A and 20B in such a manner that each triad of red, green and blue color filter elements $F_R$, $F_G$ and $F_B$ is opposite to a pair of electrodes 20A and 20B. So long as the electrodes 20A and 20B and the filter elements of optical filter 24 are aligned with each other in their longitudinal directions, their relative positioning in the lateral direction is not critical.

Figure 3:
FIGS. 3 and 4A to 4F are waveform diagrams to which reference will be made in explaining the invention.

The electrodes 20A and the electrodes 20B are respectively connected to terminals 25A and 25B, and the latter are, in turn, connected to a signal source 26 (FIG. 1) which produces an alternating signal $S_1$ (FIG. 3) that is synchronized with the line scanning period of the image pickup tube 11. This alternating signal $S_1$ is shown to have a rectangular waveform with a pulse width equal to a horizontal scanning period H of the electron beam, for example, a pulse width of 63.5 microseconds, and a frequency which is one-half of the horizontal scanning frequency, for example, 15.75/2 KHz. The signal or output electrode 22 is connected to a terminal 27 which is, in turn, connected to the input of a preamplifier 28 through a capacitor 29. Further, a DC bias voltage of 10 to 50V. is applied to terminal 27 through a resistor 30 from a power source 31.

Figures 2B, 2C:
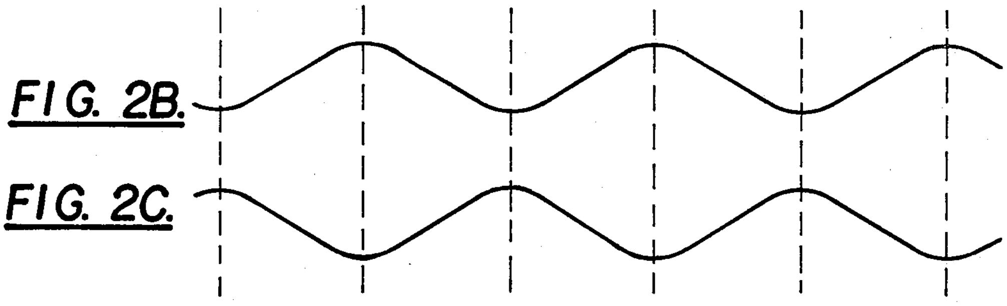
FIGS. 2B and 2C are diagrammatic views to which reference will be made in explaining the operation of the pickup tube shown on Figure FIG.

With the arrangement described above, the voltage applied to electrodes 20A is greater than the voltage applied to electrodes 20B during alternate or every other horizontal scanning periods; whereas, in the intervening horizontal scanning periods, the voltage applied to electrodes 20B is greater than the voltage applied to electrodes 20A. Thus, in the plane containing electrodes 20A and 20B, and which is spaced slightly from photoconductive layer 19 toward gun 13, a potential pattern as shown on FIG. 2B is produced during alternate horizontal scanning periods, and, in the intervening scanning periods, a potential pattern as shown on FIG. 2C is produced in the same plane. Such potential patterns affect the electron beam just prior to the landing or impingement thereof on photoconductive layer 19. In each instance, the electron beam is attracted or pulled toward the electrodes 20A or 20B which are then being supplied with the relatively higher voltage.

Accordingly, when the image pickup tube 11 is not exposed to light, a signal $S_I$ (FIG. 4A) is derived at terminal 27 due to electron beam scanning in the horizontal scanning period Hi when the potential pattern of (FIG. 2B is established, and that signal $S_I$ can be used as an index signal. The frequency of this index signal $S_I$ is optionally determined with reference to the width and spacing of the electrodes 20A and 20B and horizontal scanning period H of the electron beam, and can for example be 3.58 MHz.

Figure 5:
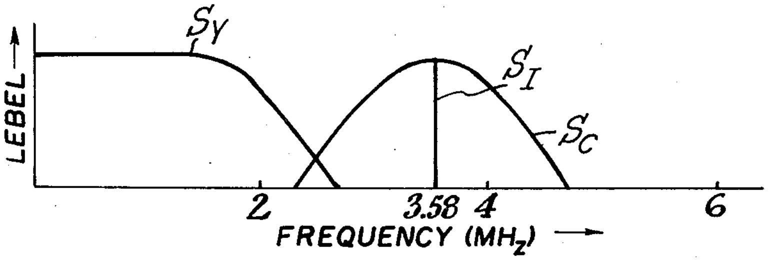
FIG. 5 is a graph showing one example of a frequency spectrum for a color video signal produced by a color television camera according to this invention.
Figure 4:
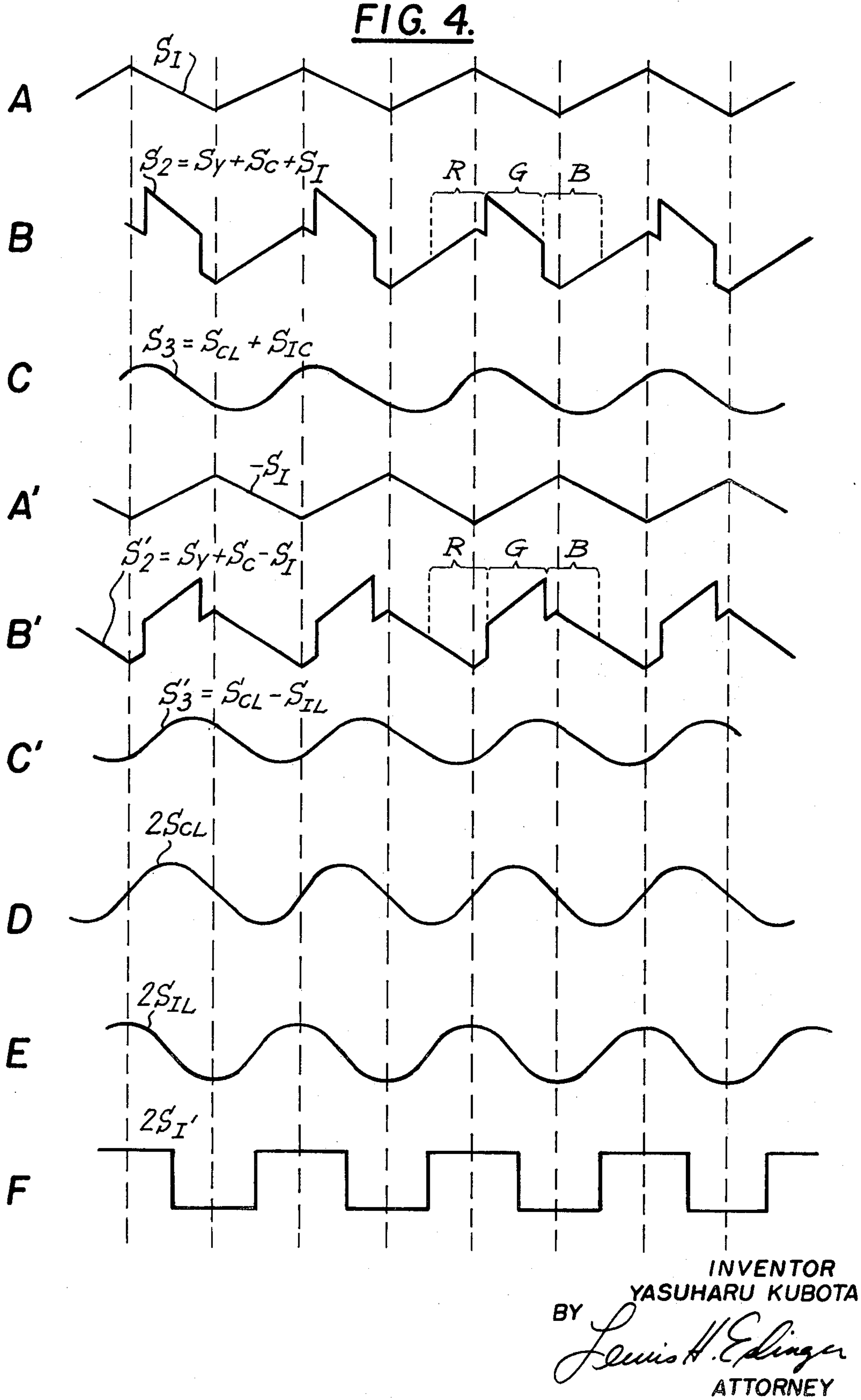

When the image of the object 18 is focused on the photoconductive layer 19, signals corresponding to the light intensities of the filtered red, green and blue components are produced on the photoconductive layer 19 in overlapping relation with the index signal $S_I$ to produce a composite signal $S_2$ such as is illustrated in FIG. 4B where the reference characters R,G and B respectively designate portions of the composite signal $S_2$ corresponding to the red, green and blue color components. It will be seen that FIG. 4B illustrates a composite signal $s_2$ which is obtained when only green light is radiated from the portion of the object 18 imagined at the horizontal line then being scanned by the electron beam. The composite signal $S_2$ is the sum of the luminance signal $S_Y$, the chrominance signal $S_C$ and the index signal $S_I$, that is, $S_2=S_X+S_C+S_I$. The frequency spectrum of the composite signal $S_2$, as illustrated in FIG. 5, is determined by the spacing of the electrodes 20A and 20B, the width of the repeat of the optical filter 24 and the horizontal scanning period. As shown, the composite signal $S_2$, in its entirety, is in a band width of 6 MHz and the luminance and chrominance signals $S_Y$ and $S_C$ are respectively arranged in the lower and higher bands. It is preferred to minimize overlapping of the luminance and chrominance signals $S_Y$ and $S_C$ and, if desired, this can be achieved by disposing a lenticular lens or the like in front of the image pickup tube 11. Such a lenticular lens optically lowers resolution and narrows the luminance signal band.

In the next horizontal scanning period $H_{i+1}$, the alternating signal applied to the electrodes 20A and 20B is reversed in phase, in which case an index signal $-S_I$ (FIG. 4A') is produced which is opposite in phase to the index signal $S_I$ (FIG. 4A). Accordingly, in scanning period $H_{i+1}$, a composite signal $S_2'$ FIG. 4B') is derived at terminal 27 and fed to the input side of the preamplifier 15. The composite signal $S_2'$ is the sum of the luminance signal $S_Y$ and the chrominance signal $S_C$ with the index signal $S_I$ subtracted therefrom. That is, $S_2' = S_y + S_C - S_I$.

Such a composite signal $S_2$ (or $S_2'$) is amplified in the preamplifier 28 and is then supplied to a process amplifier 32 for waveform shaping and/or gamma correction. Thereafter the signal is applied to a low-pass filter 33 and a bandpass filter 34. As a result, the luminance signal $S_Y$ and a signal $S_3 = S_{CL} + S_{IL}$ such as is shown in FIG. 4C (or a signal $S_3' = S_{CL} - S_{IL}$ such as is shown in FIG. 4C') are respectively derived from the low-pass filter 33 and the bandpass filter 34. In the foregoing definition of $S_3$ and $S_3'$, $S_{CL}$ and $S_{IL}$ are low frequency components or fundamental components of the chrominance signal $S_L$ and the index signal $S_I$, respectively.

Since the repetitive frequencies of the index signal $S_I$ and the chrominance signal $S_C$ are equal to each other, the separation of these signals may be achieved in the following manner without using a filter.

A delay circuit 35, for example, an ultrasonic delay line, delays the signal $S_3 = S_{CL} + S_{IL}$ (or $S_3' = S_{CL} + S_{IL}$) derived from the bandpass filter 34 by one horizontal scanning period 1H. The signal $S_3 = S_{CL} + S_{IL}$ (or $S_3' = S_{CL} - S_{IL}$) in a certain horizontal scanning period $H_i$ and the signal $S_3' = S_{CL} - S_{IL}$ (or $S_3 = S_{CL} + S_{IL}$) in the subsequent horizontal scanning period $H_{i+1}$, which are derived from the delay circuit 35 and the bandpass filter 34 are supplied to an adder circuit 36 to be added together thereon for providing, as an output, a chrominance signal $2S_{CL}$ (FIG. 4D). The content of chrominance signals in adjacent horizontal scanning periods are so similar that they can be regarded as substantially the same. Further, it is also possible to delay the signal from the bandpass filter 34 by more than one horizontal scanning period, for example, by three or five horizontal scanning periods, due to the similarity of the chrominance signal content in successive periods.

These signals $S_3 = S_{CL} + S_{IL}$ (or $S_3' = S_{CL} - S_{IL}$) and $S_3' = S_{CL} - S_{IL}$ (or $S_3 = S_{CL} \pm S_{IL}$) in the horizontal scanning periods $H_i$ and $H_{i+1}$ are also applied to a subtraction circuit 37 to achieve a subtraction $(S_{CL} - S_{IL}) - (S_{CL} + S_{IL})$ [or $(S_{CL} + S_{IL}) - S_{CL} - S_{IL})$] and to derive therefrom an index signal $-2S'_{IL}$ shown on FIG. 4E (or $2S'_{IL}$, not shown). The resulting index signal $-2S'_{IL}$ (or $2S'_{IL}$) is fed to a limiter circuit 38 to render its amplitude uniform and thereby form an index signal $-2S_I$ (or $2S_I$) of rectangular pulses, as depicted in FIG. 4F.

The index signal $-2S_I$ (or $2S_I$) thus obtained is reversed in phase at every horizontal scanning period, so that the signal $-2S_I$ has to be corrected in phase, for example, in the following manner. Reference numeral 39 designates a change-over switch, which is an electronic switch in practice but which, in its illustrated analogy has fixed contacts 39a and 39b and a movable contact 38c. The output side of limiter 38 is directly connected to one fixed contact 39a of the change-over switch 39 and to the other fixed contact 39b of the change-over switch 39 and to the other fixed contact 38b through an inverter 40. The change-over switch 39 is actuated so that the movable contact 39c makes contact with the fixed contacts 39a and 39b alternately for every horizontal scanning period in synchronism with the alternating signal $S_1$ applied to terminals 25A and 25B, to thereby derive the index signal $2S_I$ from the movable contact 39C at all times.

The luminance signal $S_Y$ from lowpass filter 33, the chrominance signal $2S_{CL}$ from adder circuit 36, and the index signal $2S_I'$ from the change-over switch 39 are applied to a matrix circuit 41 which produces color signals $S_R$, $S_G$ and $S_B$ at its output terminals $T_R$, $T_G$ and $T_B$, respectively. In a conventional manner, the matrix circuit 41 produces color difference signals $S_R - S_Y$, $S_G - S_Y$ and $S_B - S_Y$, by using the index signal $2S_I$, which may or may not have its phase suitably shifted; whereupon, the luminance signal $S_Y$ is added to each of these color difference signals to produce the color signals $S_R$, $S_G$ and $S_B$ at the respective output terminals. The color signals thus obtained may be suitably processed to provide color television signals for the NTSC system or for other standard systems.

The NTSC color signal may also be obtained by substituting for the index signal $S_I$, which is the carrier of the signals $S_3$ and $S_3'$, a color subcarrier for the NTSC system and by deriving that color subcarrier modulated by the chrominance signal. In that case, the NTSC signal is obtained directly without using the low pass filter 20 for separating the luminance signal.

Figure 6:
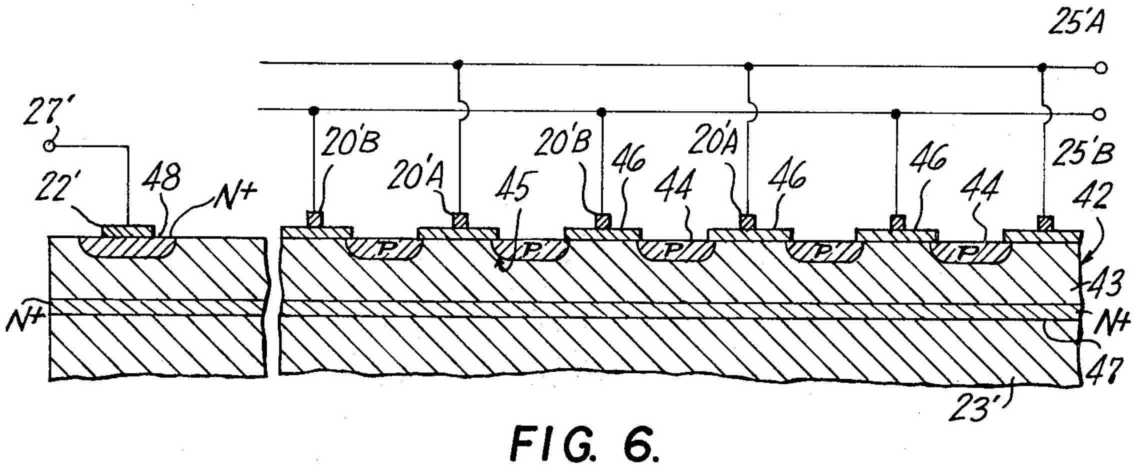
FIG. 6 is an enlarged sectional view similar to that of FIG. 2A, but showing the principal parts of a modified form of pickup tube according to the invention.

Referring now to FIG. 6, it will be seen that, in the embodiment of the invention there illustrated, the image pickup tube employs a semiconductor target 42 as its photoconductive layer. The semiconductor target 42 has an N-type silicon substrate 43 and a large number of P-type regions 44 which are diffused into the surface of substrate 43 facing toward the electron gun. The rectification junctions or P-N junctions 45 formed between the several P-type regions 44 and the N-type substrate 43 define a diode array. Stripe-like insulating layers 46, for example, of $SiO_2$, cover the surface of substrate 43 between regions 44 and extend over the junctions 45 at that surface. Electrodes 20A and 20'B, corresponding to the electrodes 20A and 20B of the first described embodiment, are respectively provided on alternate insulating layers 46, as shown, and connected to terminals 25'A and 25'B, respectively. Further, if desired, the substrate 43 may be provided with an $N^+$ or high doped impurity region 47 at the side of the substrate facing away from the electron gun, that is, at the side facing toward glass plate 23' which corresponds to the plate 23 on FIG. 2A. Such high doped impurity region 47 serves to increase the sensitivity, that is, the transducing efficiency between light energy and electric energy.

In the embodiment of FIG. 6, the output or signal electrode 22' which is connected to a terminal 27; and corresponds to the signal electrode 22 on FIG. 2A, is applied to a high-doped region 48 of $N^+$type which is formed in the peripheral portion of substrate 43 at the side of the latter facing toward the electron gun. Such region 48 is outside the area scanned by the electron beam and acts as an ohmic contact region for the signal electrode. With the embodiment of FIG. 6, the terminals 25'A and 25'B and the terminal 27' may be connected to the circuit of FIG. 1 instead of the terminals 25A, 25B and 27, respectively, and the system then operates in the same way as has been described above.

In the arrangements of FIGS. 2A and 6, the electrodes 20A and 20B or 20'A and 20'B are electrically isolated from each other by the insulating layers 21 or 46 between such electrodes and the photoconductive layer or target 19 or 42. However, if desired, the insulating layers 21 or 46 can be omitted, and the electrodes 20A and 20B or 20'A and 20'B are then isolated from each other by spacing such electrodes from the photoconductive layer.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of this invention.

What is claimed is:

1. A color television camera of the type for generating an electrical signal corresponding to an object in the field of view of said camera and which has a photoconductive layer having a surface scanned by an electron beam and which is adapted to convert light projected onto said layer into an electrical output and a color filtering device disposed between the object and said layer and forming on said layer a color separated image of said object made up of image elements each corresponding to separated color components of a respective element of said object with said separated color components appearing in a repeating cyclic order in the successive image elements considered in the scanning direction of said electron beam, wherein the improvement comprises a pair of first and second index electrodes for each of said image elements, said first and second index electrodes being arranged alternately in said scanning direction of the electron beam at the side of said layer facing the scanned surface and being electrically isolated from said layer, means for applying different electrical potentials to said first and second index electrodes of each said pair thereof and for reversing said different electrical potentials in successive periods of said electrical output so that a pattern of electrical potentials is formed on said layer which changes in said successive periods, and a signal electrode connected with said layer and deriving therefrom a composite signal containing a color video signal corresponding to said color separated image and an index signal corresponding to said pattern of electrical potentials and having its phase reversed in said successive periods.

2. A color television camera according to claim 1, wherein the improvement further comprises low-pass filter means for receiving said composite signal from said signal electrode and for separating a luminance signal therefrom, bandpass filter means for receiving said composite signal and for separating therefrom an output signal containing fundamental components of a chrominance signal and said index signal, a delay circuit for delaying the output signal of said bandpass filter by one of said periods, an adder circuit for adding said output signal of said bandpass filter means and the delayed output signal of said delay circuit to provide the chrominance signal, a subtraction circuit for subtracting said output signal of the bandpass filter means from said output signal of the delay circuit to obtain, as the output signal of said subtraction circuit, the index signal having its phase reversed in successive periods, in inverting circuit for reversing the polarity of said output signal of the subtraction circuit, switching means for alternately passing therethrough, in alternate successive periods, the output signal of said inverting circuit and the output signal of said subtraction circuit, respectively, to provide the index signal with constant phase as the output signal of said switching device, and a matrix circuit for receiving said luminance signal, said chrominance signal and said index signal of constant phase and for deriving therefrom separate color signals.

3. A color television camera according to claim 1, in which said color filtering device comprises triads of stripe-shaped filter elements transmitting light of respective primary colors and arranged in a repeating cyclic order, and there is a pair of said index electrodes for each of said triads of filter elements, with said pairs of index electrodes being stripe-shaped and extending substantially parallel to said filter elements and substantially at right angles to said scanning direction of the electron beam.

4. A color television camera according to claim 1, in which each of said pairs of index electrodes is mounted on said scanned surface of said photoconductive layer with an insulating layer provided therebetween.

5. A color television camera according to claim 1, wherein the improvement further comprises forming the photoconductive layer from a semiconductor target having a substrate of one-conductivity type and regions of the opposite conductivity type diffused into said scanned surface to form rectification junctions with said substrate and thereby to define a diode array.

6. A color television camera according to claim 5, in which said substrate has a highly doped region of one conductivity type in the peripheral portion of said scanned surface outside the area thereof scanned by said electron beam, and to which said signal electrode is connected.

7. A color television camera according to claim 5, in which said substrate has a highly doped region of said one conductivity type at the surface thereof opposed to said scanned surface.

8. A color television camera according to claim 5, in which each of said pairs of index electrodes are mounted on insulating layers which extend on said scanned surface between said regions of opposite conductivity type and which cover said rectification junctions on said scanned surface.

* * * * *